(12) United States Patent
Fornos Martinez et al.

(10) Patent No.: US 11,458,687 B2
(45) Date of Patent: Oct. 4, 2022

(54) ADDITIVE MANUFACTURING SYSTEM

(71) Applicant: HEWLETT-PACKARD DEVELOPMENT COMPANY, L.P., Spring, TX (US)

(72) Inventors: Pol Fornos Martinez, Sant Cugal del Valles (ES); Ismael Fernandez Aymerich, Sant Cugat del Valles (ES); Manuel Freire Garcia, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/605,779

(22) PCT Filed: Apr. 24, 2018

(86) PCT No.: PCT/US2018/029049
§ 371 (c)(1),
(2) Date: Oct. 16, 2019

(87) PCT Pub. No.: WO2019/209262
PCT Pub. Date: Oct. 31, 2019

(65) Prior Publication Data
US 2021/0331405 A1  Oct. 28, 2021

(51) Int. Cl.
*G06F 19/00* (2018.01)
*B29C 64/393* (2017.01)
*B33Y 10/00* (2015.01)
*B33Y 30/00* (2015.01)
(Continued)

(52) U.S. Cl.
CPC .......... *B29C 64/393* (2017.08); *B29C 64/165* (2017.08); *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/00; B33Y 50/02; B22F 10/10; B22F 10/20; B22F 10/30; B29C 64/153; B29C 64/165; B29C 64/386; B29C 64/393; Y02P 10/25
See application file for complete search history.

(56) References Cited

U.S. PATENT DOCUMENTS 9,561,622 B2   2/2017  Das et al.
9,808,994 B2   11/2017 Kritchman et al.
2004/0159978 A1 8/2004 Nielsen et al.
(Continued)

FOREIGN PATENT DOCUMENTS

CN   103777911 B   8/2016
CN   104210108 B   11/2017
(Continued)

*Primary Examiner* — Zhipeng Wang
(74) *Attorney, Agent, or Firm* — HP Inc. Patent Department

(57) ABSTRACT

In certain examples, a method comprises determining a fusing area density distribution of a build layer from build data relating to a build layer of a three-dimensional model to be printed by an additive manufacturing system. The method comprises, in response to a determination that a region of the build layer has a fusing area density outside of a fusing area density tolerance window, modifying the build layer to define a build layer in which the region has a fusing area density that is within the fusing area density tolerance window.

19 Claims, 6 Drawing Sheets

(51) Int. Cl.
*B33Y 50/02* (2015.01)
*B29C 64/165* (2017.01)

(56) References Cited

U.S. PATENT DOCUMENTS

| | | |
|---|---|---|
| 2015/0266236 A1 | 9/2015 | Farah et al. |
| 2016/0250807 A1 | 9/2016 | Atwood |
| 2017/0000141 A1 | 1/2017 | Poeppel et al. |
| 2017/0014910 A1 | 1/2017 | Ng et al. |
| 2017/0173889 A1* | 6/2017 | Thomas-Lepore .... B33Y 50/00 |
| 2017/0217106 A1 | 8/2017 | Reese et al. |
| 2018/0104897 A1* | 4/2018 | Novick ................. B29C 64/165 |

FOREIGN PATENT DOCUMENTS

| | | |
|---|---|---|
| WO | WO-2016200384 A1 | 12/2016 |
| WO | WO-2016205758 A1 | 12/2016 |

\* cited by examiner

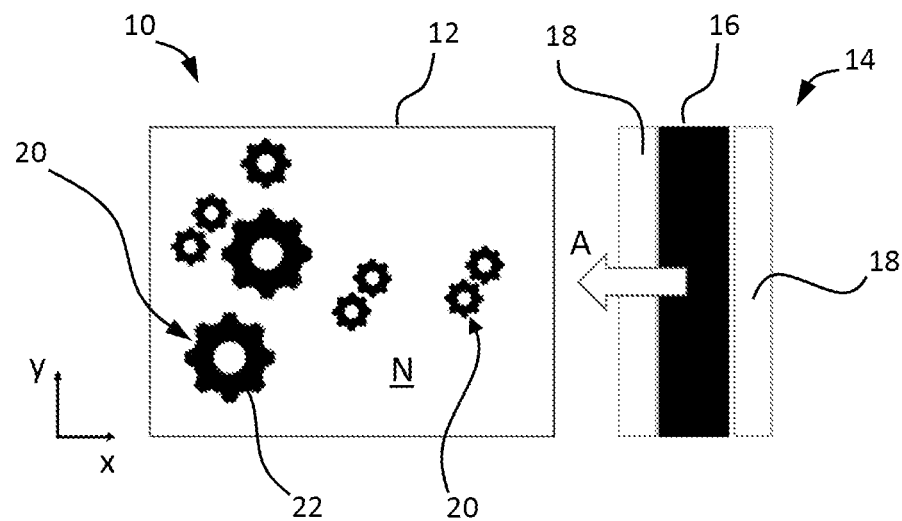
Figure 1
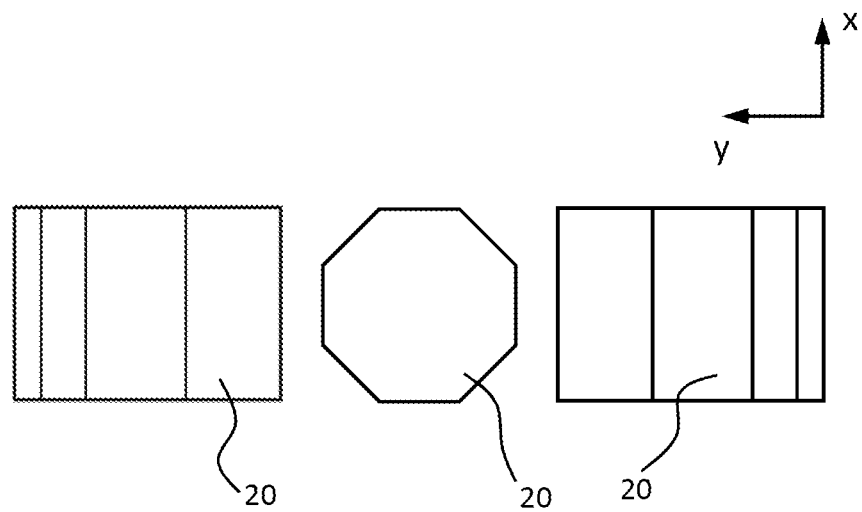
Figure 2
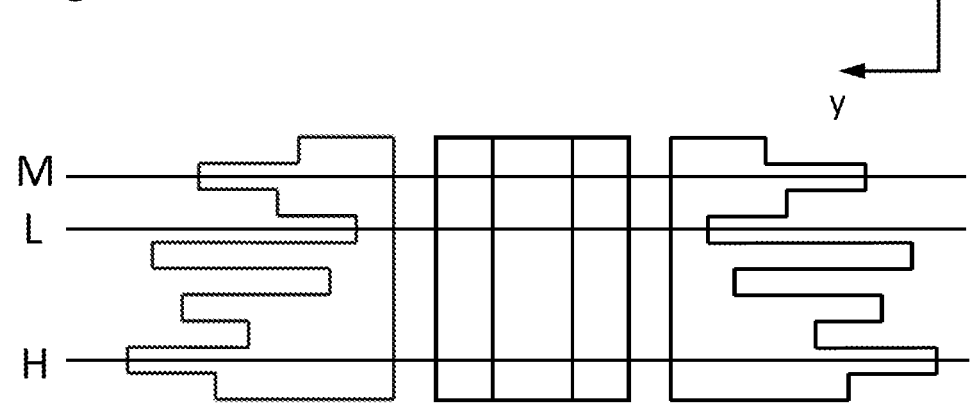

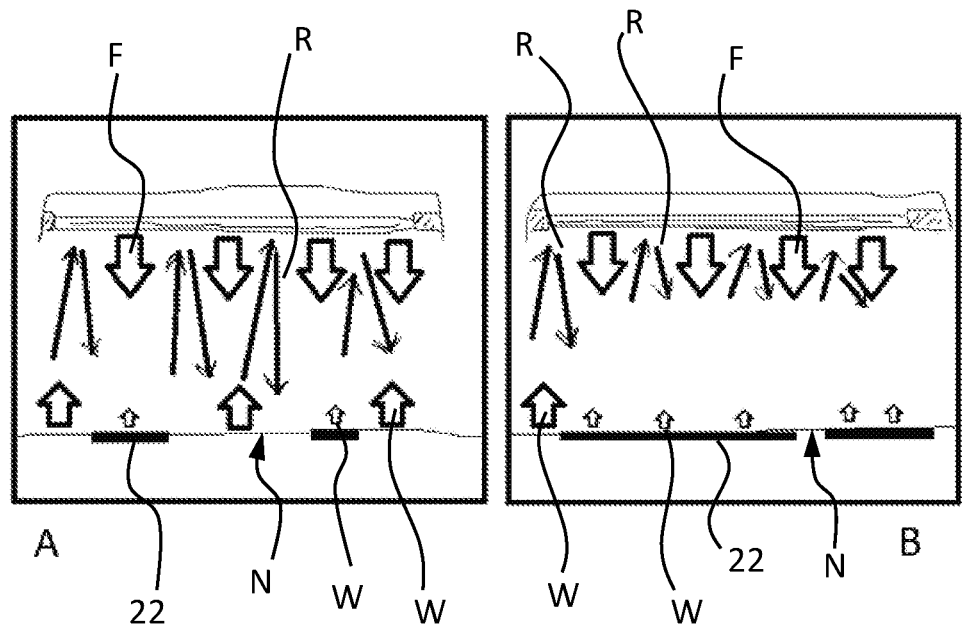
Figure 3
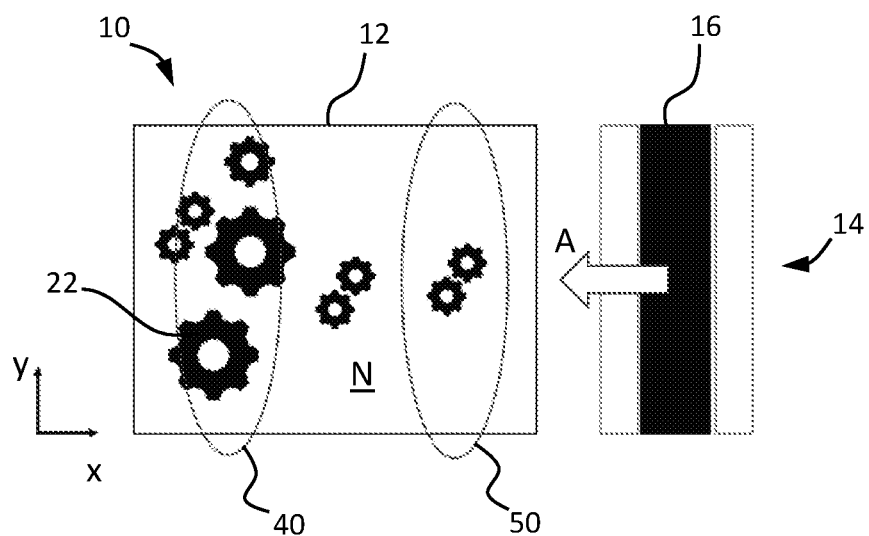
Figure 4
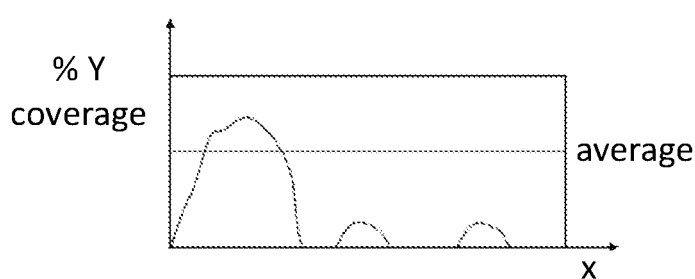

ADDITIVE MANUFACTURING SYSTEM

BACKGROUND

Additive manufacturing systems, including those commonly referred to as '3D printers', build three-dimensional (3D) objects from selective addition of build material. In one example of additive manufacturing, an object may be generated by solidifying portions of layers of build material. In examples, the build material may be in the form of a liquid, a slurry or a powder. In certain examples, energy may be applied to solidify the portions. To control the portions to be solidified, functional agents may be selectively deposited onto the layers to determine the portions solidified.

These additive manufacturing systems may receive a definition of the three-dimensional object in the form of data defining an object model, or data derived therefrom. The data may be processed and the system then instructed to produce the object on a layer-by-layer basis in a working area of the system.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIG. 1 is a schematic diagram of a plan view of an example additive manufacturing system having a build platform and a fusing system.

FIG. 2 is a schematic diagram of a plan view and a side view of an example set of printing parts.

FIG. 3 schematically illustrates a fusing operation of an example additive manufacturing system.

FIG. 4 is a schematic diagram of a plan view of an example additive manufacturing system and shows a graph plotting the fusing area density distribution of an example build layer N.

DETAILED DESCRIPTION

Figure 5:
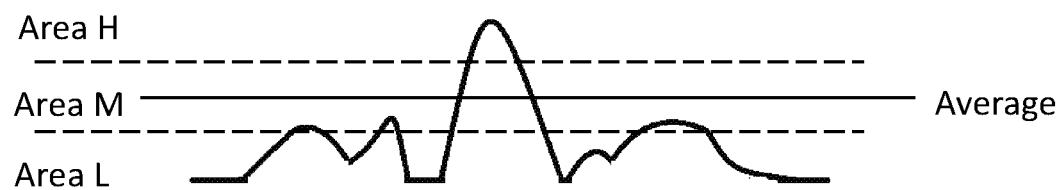
FIG. 5 is a graph plotting the fusing area density distribution of an example build layer N.

Three-dimensional (3D) objects can be generated using additive manufacturing techniques. The objects may be generated by solidifying portions of successive layers of build material. The portions of build material to be solidified may correspond with fusing areas in the layers of build material. The build material may be powder-based and the material properties of generated objects may be dependent on the type of build material and the type of solidification.

For example, various plastic powder types can be used as the raw build material. In other examples, metal powders may be used. In other examples, other build materials and may be used. In certain examples, the build material includes paste material, slurry material or liquid material. In certain additive manufacturing systems, the build material may be changed between builds.

Suitable build materials for additive manufacturing include polymers, crystalline plastics, semi-crystalline plastics, polyethylene (PE), polylactic acid (PLA), acrylonitrile butadiene styrene (ABS), thermoplastic polyurethane (TPU), amorphous plastics, Polyvinyl Alcohol Plastic (PVA), Polyamide (such as polyamide (PA) 11, PA12), thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends. According to one example, a suitable build material may be PA12 build material commercially known as V1R10A 'HP PA12' available from HP Inc. There exist more build materials and blends of build materials that can be managed by example apparatuses disclosed herein and that are not mentioned in this disclosure.

In certain examples, solidification of the build material is enabled and controlled using functional agents. In certain examples, solidification may be further enabled by temporary application of energy to the build material. In certain examples, functional agents such as fusing and/or binding agents are applied to the build material. In an example, a fusing agent is a material that, when a suitable amount of energy is applied to a combination of build material and fuse agent, causes the build material to fuse and solidify.

The fusing agent may be, for example, an energy absorber. According to one example, a suitable fusing agent may be an ink-type formulation comprising carbon black, such as, for example, the fusing agent formulation commercially known as V1Q60Q, 'HP fusing agent', available from HP Inc. In one example, such a fusing agent may additionally comprise an infrared light absorber. In one example, such an ink may additionally comprise a near infrared light absorber. In one example, such a fusing agent may additionally comprise a visible light absorber. In one example, such an ink may additionally comprise a UV light absorber. Examples of inks comprising visible light enhancers are dye based colored ink and pigment based colored ink, such as inks commercially known as CE039A and CE042A, available from HP Inc.

The fusing of the build material may be by melting or sintering of the build material, for example. In other examples, other methods of solidification may be used.

In certain examples, the applied fusing agent may define the fusing areas of a layer of build material, which correspond to the portions of a layer of build material that are to be solidified. In cases where solidification is achieved by the temporary application of energy, the fusing agent aids the absorption of the energy into the portions of a build material to be solidified. In certain examples, the energy may be radiatively applied to the layer of build material. For example, the thermal radiation may be applied to the layer of build material. For example, the energy may be applied to the layer of build material by infrared lamps.

In an example, the fusing agent may be a liquid that is applied to the layer of build material. In an example, the fusing agent may be printed onto the layer of build material. For example, the fusing agent may be an ink-type formulation printed on the layer of build material.

In certain examples, the solidification of the build material may be controlled using detailing agent. In an example, the detailing agent may be selectively applied to a layer of build material where the fusing action is to be reduced. For example, a detailing agent may be applied to reduce fusing at an object boundary to produce a part with distinct and smooth edges. The detailing agent may aid the definition of the 3D object borders and/or surfaces. The detailing agent may reduce thermal distortion in the printed 3D object layer. In an example, a detailing agent may be selectively applied to regions of a layer of build material that are not to be fused. The detailing agent may be printed on the build material. The detailing agent may be water-based. The detailing agent may be arranged to absorb thermal energy. According to one example, a suitable detailing agent may be a formulation commercially known as V1Q61A 'HP detailing agent' available from HP Inc.

Additive manufacturing systems may comprise different units. An example of an additive manufacturing system may comprise a controller and a build unit. The controller may comprise a storage module encoded with instructions executable by a processor as described further below. In certain examples, the build unit may be a component that is separate from the remaining components of the additive manufacturing system. For example, the build unit may be a removable or interchangeable unit that is separate from the controller. For example, the build unit may be interchangeable with other build units. For example, build units that have different operating parameters. For example, a build unit being configured to build with a different build material. In an example, the build unit may be interchangeable with another build unit for the sake of regular maintenance of the build unit(s).

The build unit may comprise a build platform that provides a working area on which a 3D object may be built. The additive manufacturing system may comprise a printing system. In certain examples, the build unit may comprise the printing system. In certain examples, the printing system may be a separate component of the additive manufacturing system. For example, the printing system may be a removable or interchangeable system that is separate from the build unit. For example, the printing system may be interchangeable with other printing systems which have different operating parameters, such as being configured to deposit a different range of materials. The printing system may comprise a build material deposit system for depositing a layer of build material on the build platform. The build material deposit system may comprise a build material store. The build material store may contain build material from which a 3D object may be built. In certain examples, the printing system may comprise a fusing agent application system to apply fusing agent to the layer of build material. For example, the fusing agent application system may comprise a set of printheads with nozzles that fire the fusing agent onto the layer of build material. For example, the fusing agent application system may comprise a set of printheads with nozzles that print ink on the layer of build material. In certain examples, the printing system may comprise a detailing agent application system to apply detailing agent to the layer of build material. For example, the detailing agent application system may comprise a set of printheads with nozzles that fire the detailing agent onto the layer of build material. For example, the detailing agent application system may comprise a set of printheads with nozzles that print detailing agent on the layer of build material.

The additive manufacturing system may comprise a fusing system. In certain examples, the build unit may comprise the fusing system. In certain examples, the fusing system may be a removable or interchangeable system of the build unit. In certain examples, the printing system may be integrated with the fusing system. In certain examples, the printing system and the fusing system may be removeable from each other and interchangeable with other printing and/or fusing systems. In certain examples, the fusing system may be a separate component of the additive manufacturing system. For example, the fusing system may be a removable or interchangeable system of the additive manufacturing system. In an example, the fusing system may temporarily apply energy to a layer of build material deposited on the build platform. In certain examples, the energy may be applied substantially uniformly across the whole layer of build material. For example, the energy source of the fusing system may be 'scanned' over the width of the layer of build material to apply energy to the whole of the layer of build material. For example, the fusing system may temporarily apply energy to fusing areas of the layer of build material defined by fusing agent applied to the layer of build material.

It should be understood that the additive manufacturing system may comprise all of, or some of, or one of, the units, components, and/or systems described above. For example, the additive manufacturing system comprising a controller and a fusing system may be supplied to a user separately of a build unit. Such an additive manufacturing system may be configured to operate with a range of different build units, for example. In an example, the additive manufacturing system comprising the controller having a storage module encoded with executable instructions, as described further below, may be supplied to a user separately of a fusing system, printing system, and/or a build unit.

An example build process will now be described. To build a three-dimensional (3D) object with, for example, the additive manufacturing system above, a series of build layers are successively added to the build platform during a build process. Each build layer comprises a layer of build material deposited on the build platform and, in certain examples, functional agents selectively applied to the layer of build material.

In certain examples, fusing agent is selectively applied to the layer of building material, based on build data as discussed below, to define fusing areas of the build layer where the build material is to be fused together. In certain examples, detailing agent may be applied to regions of the layer of build material.

Energy may then be applied to the build layer by the fusing system. In certain examples, following the application of functional agents, the subsequent application of energy fuses portions of the build material according to the agents that have been applied.

For example, portions of the build material, corresponding to the fusing areas of the build layer, may be fused by the absorption of the applied energy. For example, portions of the build material, where fusing agent was applied, may be fused by the absorption of the applied energy. The fused portions define one layer of the 3D object.

In certain examples, where detailing agent has been applied to regions of the layer of build material, the fusing action may be reduced or completely nullified by absorbing the energy without fusing the build material.

In certain examples, the build platform may be moved so that another layer may be added on top of the completed layer. For example, the build platform may be moved vertically downwards so that another layer of build material may be deposited on top of the previous build layer. The build process may continue by building the next build layer in the series thereby adding another layer to the 3D object. The build process may continue adding 3D object layers until the 3D object is completed. The 3D object can then be removed from the build platform.

In certain examples, the build process may be performed in the build unit of the additive manufacturing system based on build data derived from a 3D object model of the 3D object. For example, the controller may instruct the build unit to perform the build process based on build data derived from the 3D object model. The build process may involve building a larger 3D model that contains a plurality of 3D object models. For example, the 3D model may be a 3D model of the working area of the build unit in which several 3D object models are arranged for the purposes of building.

In certain examples, the build data may include build data relating to each build layer to be built on the built platform to fabricate a 3D object based on the 3D object model. For example, the build data relating to each build layer includes build data defining the fusing area(s) for each build layer. The build data may define the boundary(s), and therefore the size and position, of the fusing area(s) with respect to the build platform of the built unit. In certain examples, the build data relating to each layer may include data defining areas of the layer of build material to which detailing agent may be applied.

The build data relating to each layer may be derived by slicing the 3D object model at regular intervals along one of its axes to define a series of cross sections through the 3D object model. The series of cross sections may be parallel cross sections. The size of the interval may correspond with the desired thickness of each build layer, which may be determined by such factors as desired resolution of the completed 3D object.

It is desirable that the boundaries of the fused portions for each built 3D object layer correspond to the contour lines of the respective cross section through the 3D object model. Since the fused portion(s) for each built 3D object layer correspond with the fusing area(s) of the respective build layer, the boundary, or boundaries, for each fusing area also correspond to the contour line, or lines, of the respective cross section through the 3D object model. Hence, the build data defining the fusing area(s) for the build layer may be derived from the respective cross section through the 3D object model.

An example additive manufacturing system 10 will now be described with respect to FIG. 1.

The additive manufacturing system can fabricate a three-dimensional (3D) object on its build platform 12. The build platform 12 is shown in plan view in FIG. 1. For ease of understanding, the additive manufacturing system 10, along with its functionality, will be described with respect to a cartesian coordinate system (X, Y, Z) as shown in the figures.

The build platform 12 provides support to a 3D object 20 as it is build and supports the build material from which the 3D object 20 is built. As FIG. 1 shows, the build platform 12 may extend in the X-direction and the Y-direction. The build platform 12 may be movable in a three-dimensional space. For example, the build platform 12 may be movable in the Z-direction to allow a plurality of build layers to be built. For example, the build platform 12 may be movable incrementally in the Z-direction. Unfused build material may support the both the build layers above and the solidified 3D object as it is built.

An example of a build layer N, from which a layer of a 3D object may be built, is shown in FIG. 1. The build layer N comprises a layer of build material deposited on the build platform 12. The build layer N may comprise a fusing area 22 that corresponds to a portion of build material that, when fused, will form a 3D object layer. The fusing area 22 may have at least one boundary. The fusing area 22 may have a plurality of boundaries. In FIG. 1 for example, the 3D objects 20 are gear-shaped and each have two boundaries. More than one 3D object may be fabricated on the build platform 12 meaning there may be a plurality of fusing areas on the build layer N. A 3D object layer may itself comprise more than one fusing area on a build layer N.

As discussed above, in certain examples, the fusing area 22 may be defined by a fusing agent applied to the layer of build material deposited on the build platform 12. For example, the fusing agent may be an ink-type formulation printed on the layer of build material.

The example additive manufacturing system 10 includes a fusing system 14 for fusing portions of the build material deposited on the build platform. The fusing system 14 may be positioned above (in the Z-direction) the build platform 12. The fusing system 14 may be positioned a distance above the build platform 12. The fusing system 14 may temporarily apply energy to a layer of build material deposited on the build platform 12.

In certain examples, the fusing system 14 comprises a movable fusing carriage 16 that radiates energy towards the build platform 12 as it passes overhead. The movable fusing carriage 16 may radiate a constant energy level towards the build platform 12 as it moves. As discussed above, the fusing system may be a separate component of the additive manufacturing system or may be a component of the build unit or may be a component of the printing system. Hence, in certain examples, the movable fusing carriage 16 may be part of the build unit. Hence, in certain examples, the movable fusing carriage 16 may be integrated with the printing system. In certain examples, the movable fusing carriage 16 may comprise the fusing agent application system and/or the detailing agent application system that apply the fusing agent and/or the detailing agent layer of layer of build material. For example, the movable fusing carriage 16 may comprise a set of printheads with nozzles that fire fusing agent and/or detailing agent onto the layer of build material.

In the example shown in FIG. 1, the fusing carriage 16 moves backwards and forwards over the build platform 12 in the X-direction as indicated by arrow A. The fusing carriage 16 may include fusing lamps 18. In an example, the fusing carriage 16 may include four fusing lamps 18. The lamps 18 may be arranged in pairs. Any suitable number of lamps may be provided on the fusing carriage 16, for example one lamp or multiple lamps. The fusing lamps 18 may radiate thermal energy. The lamps 18 may include reflectors behind the lamp energy source. The reflectors maximise the energy radiated towards the build platform 12. In the example shown in FIG. 1, the fusing carriage 14 conveys the lamps 16 backwards and forwards over the build platform 12 in the X-direction to radiate energy towards parts of the build platform 12. The fusing areas 22 absorb radiated energy from the fusing carriage 16 as it passes overhead causing corresponding portions of the build material to heat up and fuse to form a 3D object 20 layer. In certain examples, the fusing agent may aid the absorption of the energy radiated to the build platform 12.

Within additive manufacturing systems, such as the example system 10 shown in FIG. 1, it is often desired to fabricate high quality objects. For example, these may be objects with well-defined surfaces and good stability. Stable objects may avoid part and build unit failure, for example due to lifted or curled edges. Similarly, it is often desired to reduce or avoid fabrication objects including poorly defined surfaces, for example partial solidified surfaces or boundaries. Issues with object quality during fabrication may lead to objects being discarded, which is wasteful of both manufacturing time and materials. Quality issues may also be in the form dimensional errors building up in the object or in the visual appearance of the finished object being unsatisfactory.

Some of these quality issues may be caused by energy absorption variances across regions of a build layer. They may also be caused by energy absorption variances between build layers. The energy absorption variances may cause the quality issues because heat retained in the 3D object layers during fabrication may not be at a desirable level. The Applicant has identified that these absorption variances may be due to a variance in fusing area density between regions of the build layer or between different build layers The fusing area density is the proportion of fusing area in each region of the build layer N. In an example, the fusing area density may be quantified as the ratio of fusing area of a region of the build layer to total area of the region. The fusing area density may be expressed as a percentage.

In certain examples, for the example build layer N shown in FIG. 1, the fusing area density may be quantified in the Y-direction of the build layer N with respect to the X axis. In an example, the fusing area density may be quantified as a ratio of Y-direction fusing area coverage to total Y-direction build layer area at each position along the X-axis. The fusing area density may, for example, be expressed as a percentage of Y-direction fusing area coverage.

In an example, the fusing area density may be quantified based on discrete intervals along the X axis dividing the build layer N into discrete strips. The fusing area coverage may then be measured for each strip of build layer N. In an example, the fusing area density may be quantified at each point along the X axis to define a fusing area density distribution curve, such as the distribution curves plotted in FIG. 4 and FIG. 5.

The effect of the variance in fusing area density between regions of the build layer and/or between different build layers will be explained with respect to FIG. 2.

In some examples, where more 3D objects are being fabricated on a build platform, or where the 3D object is large, then more of the build layer N may be taken up by fusing area. Thus, the build layer N will have a high fusing area density. Accordingly, more energy will be used to fuse the larger fusing areas of the layer of printer material. Where the energy radiated by the fusing system is constant, the delivered energy is shared amongst the fusing areas. A lower portion of radiated energy is received by the fusing area(s), which leads to a lower temperature in the build material in those 3D object layers.

Lower temperatures in the build material can affect the 3D objects surface quality, visual appearance and/or dimensional accuracy. In one example, where there is insufficient energy for all the fusing areas, 3D objects may be defective by having visible strips or channels, giving the appearance of wrinkled skin, which may be referred to as 'elephant skin'.

Conversely, in some examples where fewer 3D objects are being printed in a 3D print job, or where the portion of a 3D object is smaller, then less of the build layer N will be taken up by fusing area. Thus, the build layer N will have a low or medium fusing area density. In this instance, more of the constant energy applied will be absorbed by the smaller fusing areas of the build layer N. In other words, there is an increase in the portion of radiated energy received by the smaller fusing area(s) in comparison with a build layer N having a high fusing area density. This leads to higher temperatures in the build material in these 3D object layers, which results in overheated 3D objects leading to defects such as thermal bleed in which partially melted printer material, for example powder, attached to the fused part layers.

FIG. 2 illustrates, with example 3D objects 20, how a variance in fusing area density can occur in objects.

FIG. 2 shows a set of objects 20 in plan view (X-Y plane) and from a side view such that the build direction is visible (Y-Z plane). The cross-sectional area of most objects will vary along the Z axis. As can be seen from FIG. 2, the cross-sectional area of the two 'stepped' parts illustrated varies along the Z-direction. Accordingly, the fusing area in each build layer will vary and, therefore, so will the build layer's fusing area density.

In FIG. 2, three planes through the objects 20 have been indicated. The planes may correspond to build layers. Each a plane may be a build layer having a difference fusing area density. Plane H indicates a build layer that has a high fusing area density. Plane L indicates a build layer having a low fusing area density. Plane M indicates a build layer that has a medium fusing area density, in other words somewhere in between the high and low fusing area densities.

The additive manufacturing system may be tuned to deliver a desired level of energy to a build layer having a high fusing area density, medium fusing area density, or a low fusing area density. However, if tuned to one of these energy levels then 3D objects built from layers with a different desired energy level may suffer from the part quality issues identified above.

If, for example, the additive manufacturing system is tuned to build high fusing area density planes then good part quality in those high fusing area density planes will be expected and poor part quality on other fusing area planes. Conversely, a system tuned for low fusing area density planes will may display insufficient energy defects in high fusing area density regions of a build layer. Hence, tuning the level of constant energy delivered by the fusing system may be unsatisfactory.

In addition to varying between build layers, the fusing area density may vary across regions of a build layer N. For example, one region of a build layer N may have a high fusing area density while another region of the build layer N may have a lower fusing area density. An example of a build layer N with regions of differing fusing area density is shown in FIG. 4. In the example build layer N, a region 40 of build layer N has a high fusing area density and region 50 of build layer N has a low fusing area density.

Again, whilst the tuning the level of constant energy delivered by the fusing system 14 may provide a desired level of energy to region 40, this may lead to fabricated object quality issues for the parts produced in region 50 due to the lower fusing area density.

One way to address the absorption variances across regions of a build layer and/or absorption variances between build layers is to arrange 3D objects in the working area of the build platform as uniformly as possible. However, due to the geometry of some parts, it is difficult to have uniform content at each layer and some fusing area density variance will always be present.

In attempting to address the absorption variances across regions of a build layer, the Applicant has identified another issue within additive manufacturing systems such as the examples described above. The Applicant has determined that the amount of energy that is reflected around the internal space of the build unit above the build platform may detrimentally affect the quality of the part produced.

Whilst a portion of the energy applied by the fusing system will be absorbed by the fusing area(s) of the build layer N, some energy will be reflected off the build material into the internal space above and around the build platform. The reflected energy may then bounce back from build unit components to the build layer and be absorbed by the other portions of the build material. For example, the lamp 18 reflectors, described above, may reflect a large portion of the energy from the build material back to the build layer since they are intended to be highly reflective. In particular, reflected energy may be absorbed by fusing area(s) of the layer of build material since these areas may, in an example, be defined by the fusing agent and be intended to absorb the energy more easily.

Thus, fusing area(s) of the build layer N may receive more energy than was intended to be delivered by the print system leading to non-uniform heating in the build material. The Applicant has termed this reflection effect as energy re-radiation since fusing energy is being re-radiated onto the build platform 12. This re-radiation effect has not been identified previously in additive manufacturing systems. These effects may, on their own, lead to distortion of the fabricated objects and the object quality issues discussed above. Furthermore, the re-radiation effects may serve to amplify the issue above wherein the variance of fusing area density across differing regions of a build layer N influences the quality of the fabricated objects. Thus, the re-radiation effect has an impact not just on the appearance of a part, but also on its mechanical and dimensional properties.

The amount of energy re-radiation may be particularly large where the build material is naturally more reflective, for example where the build material is a white material. For example, where the material is a white plastics powder, such as a polyamide powder.

The Applicant has also identified that the energy re-radiation effect may be dependent on the fusing area density of regions of the build layer N with respect to the fusing area density of the whole build layer N. In an example, the energy re-radiation effect may be variable dependent on the amount of fusing agent applied to each build layer N. For example, if there is a small fusing area on the build layer relative to the size of the build platform then the re-radiation effect will be larger.

FIG. 3 illustrates how the fusing area density may change the re-radiation effect. Box A is a diagram of a side view of a build platform 12 in which the build layer N has a low fusing area density. Box B is a diagram of a side view of a build platform 12 in which the build layer N has a high fusing area density. Above the build platform 12 a structure supports the fusing system 14 allowing it to deliver energy to the build platform 12 below. The structure may include the fusing lamps 18 and their associated reflectors, for example.

The arrows in box A show the re-radiation effect on a low fusing area density build layer N. Arrows F indicate energy emitted from the fusing system 14 towards the build platform 12. Arrows W indicate energy reflected off the build layer N. The larger W arrows indicate areas of the build layer N where larger amounts of energy may be reflected off the build layer N. The smaller W arrows indicate areas of the build layer N where relatively smaller amounts of energy may be reflected off the build layer N. For example, a white build material will reflect a larger amount of energy in comparison with black fusing areas of the build material. Arrows R indicate energy re-radiated towards the build layer N.

The arrows in box B show the re-radiation effect on a high fusing area density build layer N. Like-arrows in box B are indicated by like-reference signs. It is apparent from a comparison of box A with box B that, where a build layer N has a larger ratio of fusing area, more of the applied energy is absorbed by the build material and, hence, less energy is reflected (arrows W) into the space above the build platform 12. Thus, in box A the re-radiation effect is greater. For example, in box A, most of the energy reflected energy will be absorbed by relatively smaller fusing areas thereby exposing the fusing areas to more energy than was intended and contributing to the distortions discussed above.

In certain additive manufacturing system examples in which a movable fusing carriage applies energy to a build layer, the Applicant has found that the re-radiation effect may be dependent on the local fusing area density of the region of a build layer being irradiated by energy from the fusing system. The local area fusing density of other regions of the build layer are not as relevant since the energy applied by the fusing system is not focused on those other regions.

For additive manufacturing systems that have a fusing carriage 16 that moves in the X-direction, such as the example shown in FIG. 4, the level of the re-radiation effect is dependent on the Y axis fusing area density of the build layer N. This is because the fusing carriage 16 applies the fusing energy as a constant band of radiated energy across the whole width, in the Y-direction, of the build platform. Hence, variances in Y-direction fusing area density along the X axis will cause variances in the energy absorbed by the build material as the fusing carriage moves along the X axis.

Certain examples of additive manufacturing systems, build processes, and methods for managing the re-radiation effect will now be described.

Certain examples described herein account for fusing area density variance across regions of a build layer to compensate for the variance in reflected energy from those regions. In examples, the amount of energy that can be absorbed by different regions of the build layer can be harmonized to reduce the impact of re-radiation on fabricated object quality. In examples, the amount of energy that can be absorbed by different build layers may also be harmonized.

Certain method examples described herein involve modifying build layers to define revised build layers wherein the fusing area densities of all regions of the revised build layer are within a desired fusing area density tolerance window. In certain examples, the fusing area tolerance window may be derived from a determination of the average fusing area density of the build layer. That is to say, the average fusing area density across all the regions of the build layer. In certain examples, the fusing area tolerance window may be derived from a determination of the average fusing area density of all the build layers that will be built during a build process.

The example methods may be applied before, at the beginning of a build process, and/or at any time where a portion of a 3D object is formed on non-solidified layers of build material.

With reference to FIG. 4, examples of modifications to a build layer N will now be described. In certain examples, to compensate for fusing area density variance in a build layer N, fusing area density modifications may be made to a region of a build layer N to alter the fusing area density so that it falls within a fusing area density tolerance window.

In certain examples, the modifications may be made by adding or modifying fusing areas of the build layer N. For example, this may be achieved by applying additional areas of fusing agent on the layer of build material.

In certain examples, the modifications may be made by reducing the size of a fusing area. For example, by reducing the area to which fusing agent is applied without changing the outer borders of the fusing area.

In certain examples, detailing agent may be applied to modify the fusing area density of a region of a build layer. For example, additional areas of detailing agent may be applied to the build material.

FIG. 4 shows a graph plotting the fusing area density of a build layer N in the Y-direction width across the X-direction length of build platform 12. The fusing area density in the Y-direction is indicated as a percentage of Y-direction coverage of fusing area. FIG. 4 also plots the average fusing area density for the whole build layer N. As the FIG. 4 graph illustrates, the region of the graph corresponding to region 40 of the build layer N has an above average fusing area density whilst the region of the graph corresponding to region 50 of the build layer N has a below average fusing area density.

To determine the average fusing area density and the fusing area density of regions of a build layer N, the build data relating to the build layer N may be analysed.

FIG. 5 shows a graph of results from a fusing area density analysis of an example build layer N. FIG. 5 shows the average fusing area density and the fusing area density distribution for build layer N. The fusing area density is presented as percentage of the width (Y-direction) covered by fusing area(s). Area M indicates regions of the build layer N where the fusing area density is similar to the average fusing area density of the build layer N. These are regions may be considered as within a tolerance window as indicated by the dashed lines in FIG. 5. Areas H and L are regions of the build layer N where the fusing area density is far from the average. These are areas that may be considered as outside the tolerance window. Area H indicates high fusing area density areas. Area L indicates low fusing area density areas.

In certain examples, following the analysis, regions of the build layer N that have fusing area densities that are below the average, i.e. below the tolerance window, may have their fusing area densities increased. In certain examples, regions of the build layer N that have fusing area densities that are above the average, i.e. above the tolerance window, may have their fusing area densities decreased. Different methods may be employed to modify the fusing area densities accordingly.

In certain examples, to determine whether a modification should be made to a region of the build layer N, the fusing area density of that region may be compared with a fusing area density tolerance window to determine whether it falls within the window. In an example, the fusing area density tolerance window may be defined from a predetermined fusing area density with an acceptable range (plus/minus) of deviation of the density from the average.

In certain examples, the predetermined fusing area density may be derived from the average fusing area density of the build layer N. Such as the example average fusing area density obtained in the analysis above and shown in FIG. 5. In certain examples, the predetermined fusing area density may be derived from the overall average fusing area density of all the build layers N to be built during the build process. In other examples, the predetermined fusing area density may be determined with reference to the desired energy level to be emitted by the fusing system.

In certain examples, the fusing area density tolerance window may be defined with reference to a range that corresponds to a medium fusing area density, for example the medium fusing density discussed above. For example, the deviation from the predetermined fusing area density may be linked to permissible defect level in the fabricated 3D objects. In an example, the deviation from the predetermined fusing area density may be selected for computational convenience.

Processes for decreasing the fusing area density of a region of the build layer N having a fusing area density above the fusing area tolerance window will now be discussed.

Large solid 3D objects may mean large fusing areas on the build layer N. In certain examples, the fusing areas may be modified so that build process fabricates hollow the large solid 3D objects. In other words, a large solid part may be provided with a cavity.

In certain examples, the build layer N may be modified by defining at least one additional boundary in a fusing area in which the additional boundary is inside the outer boundary of the fusing area. In other words, in an example, when the fusing agent is applied to a layer of build material to define the fusing area, a thick line defines the shape of the fusing area and the shape is unfiled with fusing agent. Such a modification may be performed with the structural integrity of the 3D object in mind.

Figure 6:
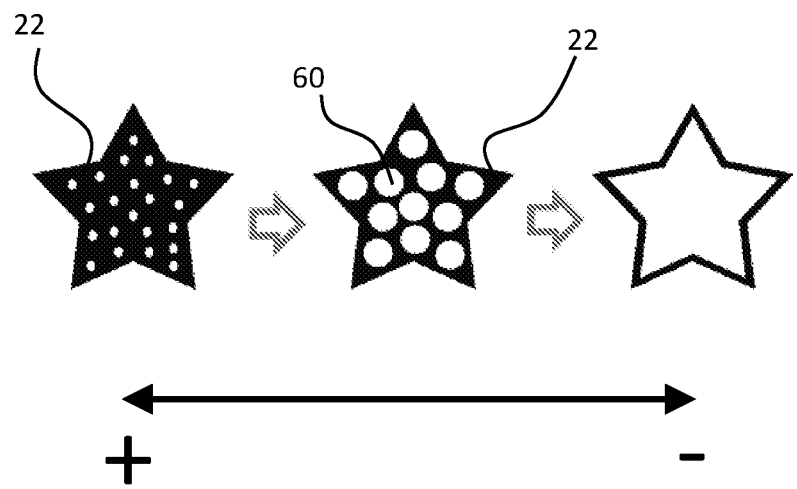
FIG. 6 is a schematic diagram of different examples of a 3D object layer each with different fusing area densities.

An example of a hollowed 3D object is shown at the right-hand end of FIG. 6, which shows a 3D object having a range of fusing area densities. In FIG. 6 the object at the left-hand end has a high fusing area density as indicated by the '+' sign and the object at the right-hand end has a low fusing area density as indicated by the '−' sign.

In certain examples, internal structures may also be applied to a 3D object. Such internal structures are illustrated in the example 3D objects shown in the centre and left-hand end of the FIG. 6 continuum. In certain examples, the internal structures may be formed by modifying a build layer so that the fusing area defining the solid layer of the part has a reduced total area compared with the original fusing area.

In certain examples, this may be achieved by defining a plurality of additional boundaries inside the outer boundary of the fusing area. The additional boundaries define the geometry of the internal structures. Such internal structures may be seen in the left-hand and centre 3D objects shown in FIG. 6. The additional boundaries may create different sized holes in the part, for example. The internal structures may vary in size depending on the amount of fusing area density reduction desired.

In certain examples, the internal structures may be defined in the fusing areas to be consistent throughout all the 3D objects built during a build process. Thus, in certain examples, the internal structures may be constrained to have the same geometry as all other internal structures defined in a plurality of build layers N'; the plurality of build layers N' being all the build layers N' to be built during the build process. Defining consistent internal structures will maintain, for example, the centre of mass of the 3D object as originally designed whilst also improving the part quality. This method also allows part repeatability across multiple printings of the part.

In certain examples, the internal structures may be defined by the fusing areas to be consistent throughout a 3D object. Thus, in certain examples, the internal structures may be constrained to have the same geometry as all other internal structures defined in a neighbouring fusing area of a neighbouring build layer N'. This allows the fabricated 3D object to have consistent structure and density throughout whilst improving the part quality. This method will maintain, for example, the centre of mass of the 3D object as originally designed.

In certain examples, modifying the fusing area(s) so that the internal structures are constant throughout the 3D object or throughout all the 3D objects may involve an analysis of the fusing area densities of all the build layers N to be built. The calculation will need to account for all the different density distributions on each build layer and then select an appropriate structure and structure size that brings each build layer N within the fusing area density tolerance window.

In certain examples, the internal structures may be defined for the fusing areas for each build layer N'. Thus, in certain examples, the internal structures may be constrained to have the same geometry as all other internal structures on the build layer N'. For example, the internal structures may be defined for the particular build layer N. Hence, following the build, neighbouring 3D object layers may have different internal structures. Defining variable internal structures for each build layer is not as computationally time consuming. Furthermore, the fusing area density for each region of the build layer N may be adjusted more precisely to fit within the fusing area density tolerance window.

Processes for increasing the fusing area density of a region of the build layer N having a fusing area density below the fusing area tolerance window will now be discussed.

In certain examples, the fusing area densities of low fusing area density regions of the build layer N may be increased by fusing portions of the build material in that region. For example, fusing areas may be defined in low fusing area density regions of the build layer N. For example, fusing agent may be applied to the layer of build material to define a fusing area. The presence of the additional fusing area will increase the fusing area density in that region.

In certain examples, the fusing area densities of low density areas of the build layer N may also be increased by applying detailing agent to the layer of build material in that region of the build layer N. For instance, detailing agent may be laid or printed in between fusing areas of the build layer N. The defining agent laid in these areas will absorb a portion of the energy radiated from the fusing system 14 and thus share a portion of the applied fusing energy. This reduces the energy portion being absorbed by the fusing area, which correspondingly reduces the heating of the solidified build material. The application of detailing agent can therefore reduce part defects such as poor visual appearance from thermal bleed for instance.

In certain examples, the detailing agent may be laid in solid patches, i.e. filled in shapes of detailing agent. In other examples, the detailing agent may be applied as detailing agent structures. The detailing agent structures will have a level of fusing area density that is equates to the desired reduction in fusing area density.

In certain examples, the detailing agent may have an energy absorbency rate that differs from the energy absorbency rate of a fusing area. For example, where the fusing areas are defined by an applied black ink fusing agent, the energy absorbency of a water-based detailing agent may be lower. The differences in energy absorbency rate will need to be accounted for when calculating the amount of detailing agent.

Figure 7:
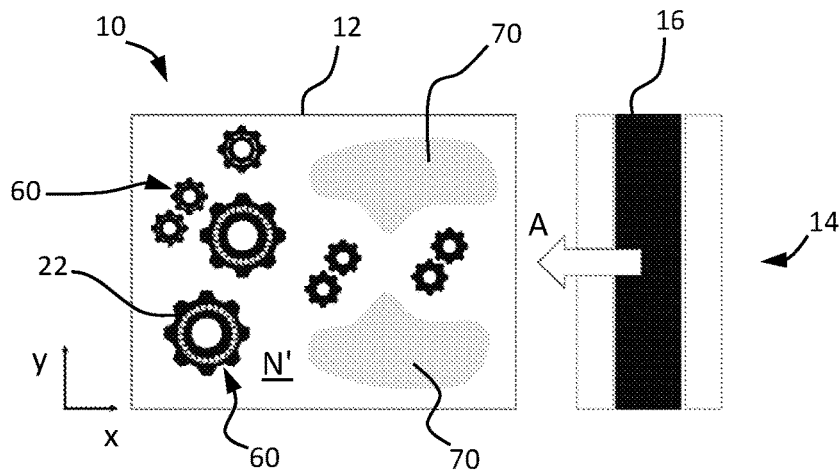
FIG. 7 is a schematic diagram of a plan view of an example additive manufacturing system and shows a graph plotting the fusing area density distribution of an example build layer N'.
Figure 7:
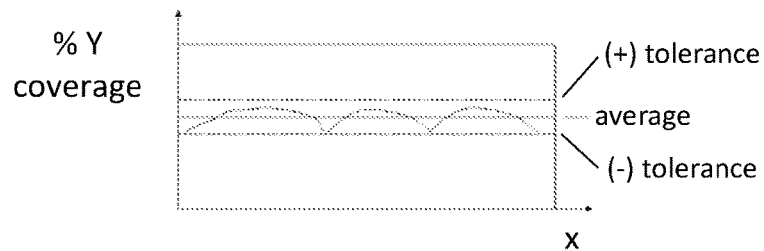

FIG. 7 is a schematic diagram of an example build layer N' resulting from the application of some of the modifications to a build layer N described above. For example, solid detailing agent patches 70 have been added to the build layer N' to increase the fusing area density in previous region 50 of FIG. 4. The fusing areas 22 have also had structures included to reduce the fusing area density in previous region 40 of FIG. 4.

FIG. 7 also shows a graph plotting the fusing area density of a build layer N' in the Y-direction across the X-direction length of build platform 12. The fusing area density in the Y-direction is indicated as a percentage of Y-direction coverage.

The graph in FIG. 7 also plots the predetermined fusing area density for the build layer N'. For example, the predetermined fusing area density may be the average fusing area density in the Y-direction for the build layer N. The fusing area density tolerance window is also indicated by the permitted positive (+) and negative (−) deviations from the predetermined fusing area density.

As the graph in FIG. 7 illustrates, modifications to the regions 40, 50 of the build layer in FIG. 4 have brought the fusing area density of those regions in build layer N' within the fusing area density tolerance window.

An example of a method, in which a build layer N may be modified to define a build layer N' in which the fusing area densities of all regions of the revised build layer are within a desired fusing area density tolerance window. The example method will be described with respect to the flow chart of FIG. 8. In certain examples, the example method may be performed in the controller of an example additive manufacturing system as described herein. In certain examples, the example method may be performed remotely from an example additive manufacturing system as described herein and build data relating to the build layer N' transmitted to the additive manufacturing system.

At block 102, a fusing area density distribution of the build layer (N) may be determined. The fusing area density distribution may be determined from build data relating to the build layer (N) of a three-dimensional (3D) model to be printed by an additive manufacturing system.

In certain examples, the 3D model may be a 3D model of a 3D object model, or of a plurality of 3D object models, that are to be built on a build platform of a build unit, for example a build unit as described above. For example, the 3D model may be a model of one, or several, 3D object models arranged in a 3D model space that has X and Y dimensions corresponding to the build platform. The completed build may be a physical representation on the build platform of the 3D model.

In certain examples, and as described above, the build layer N has at least one fusing area corresponding to a portion of a layer of build material that is to be fused by a fusing system, for example a fusing system as described above. The build layer N may have a plurality of fusing areas.

An example of fusing area density distribution fora build layer N is shown in FIG. 5. In certain cases, such as the build layer N examples described above, the build data may be analysed to determine the fusing area density distribution across the width (Y axis) of the build platform at each point along the length of the build platform (X axis). In certain examples, the build data may be analysed to determine the fusing area density of one region, or some regions, of the build layer N.

At block 104, the build layer N may be modified to define a build layer N' in which a region has a fusing area density that is within a fusing area density tolerance window. The modification may be made in response to a determination that the region of the build layer N has a fusing area density outside of the fusing area density tolerance window.

The fusing area tolerance window may be defined in accordance with the examples discussed above. For example, the fusing area tolerance window may be derived from a determination of the average fusing area density of the build layer N. In another example, the fusing area tolerance window may be derived from a determination of the average fusing area density of all the build layers N that will be built during a build process.

In certain examples, the modification may be made for every region of the build layer N that is determined to have a fusing area density outside of the fusing area density tolerance window. For example, all the regions of the build layer N' may be defined to have fusing area densities that are within the fusing area density tolerance window.

Defining a build layer N' in which all regions have fusing area density fusing area density tolerance window will reduce the re-radiation effect and help all the regions of the build layer N' receive the right amount of energy during fusing. The modifications to the fusing area densities of the build layer N' may also aid in reducing the part quality issues arising from energy absorption variances between neighbouring build layers. The Applicant believes the modifications to the fusing area densities of the build layer N' specifically help to: homogenize the fusing area absorption thereby reducing defects arising from thermal bleed; ensure a regular fusing or melting of 3D object layers; improve the surface uniformity 3D objects; improve dimensional properties and accuracy of 3D objects; and improve productivity by reducing 3D object quality defects.

In certain examples, no modification to the fusing area densities of any of the regions of the build layer N is needed because all the fusing area densities are within the fusing area density tolerance window. In some examples, a build layer N' may then be defined that is the same as build layer N.

Figure 8:
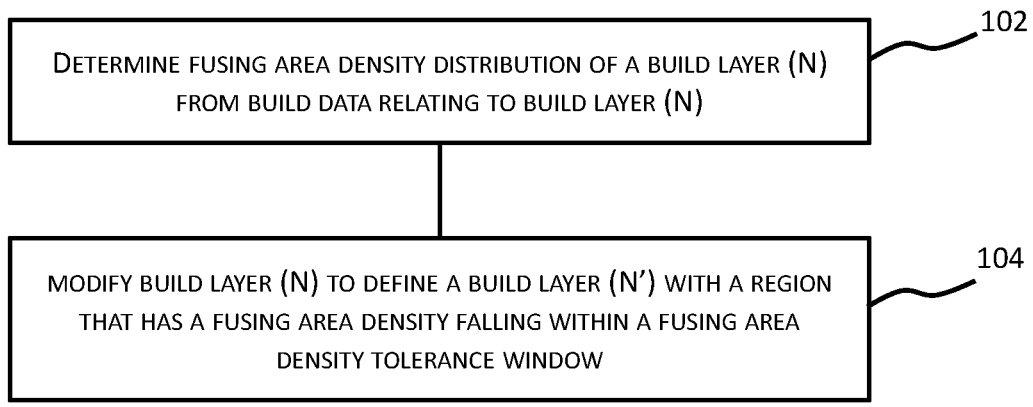
FIG. 8 is a flow chart of an example method of modifying a build layer N to define a build layer N'.

In certain examples, the method of modifying a build layer N, described with respect to FIG. 8, may be performed on a plurality of build layers N. For example, the method may be performed on all the build layers that will be built to fabricate the 3D object(s).

Figure 9:
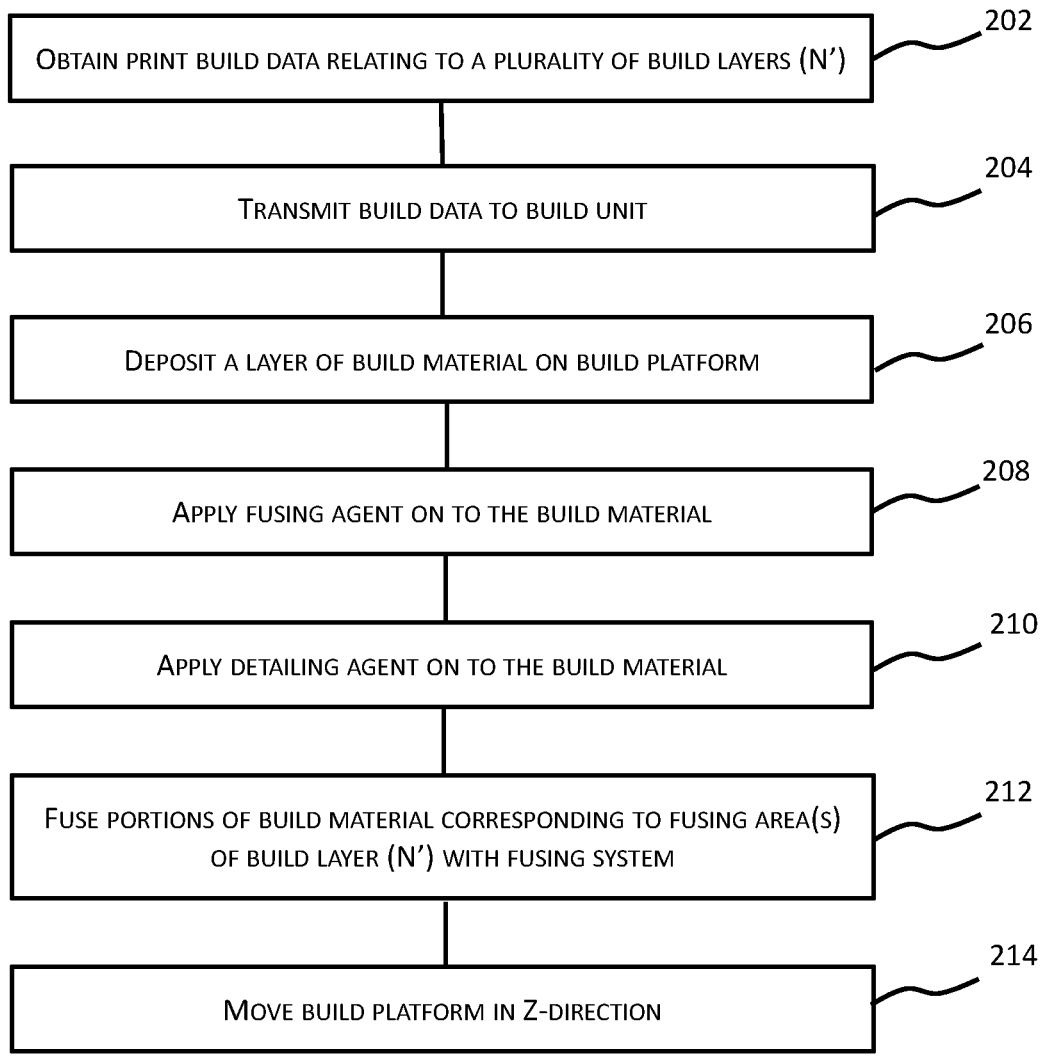
FIG. 9 is a flow chart of an example build process for building an example build layer N'.

Once the modifications have been performed on each build layer N to define the build layers N', then the build layers N' may be built. The build process is described with respect to FIG. 9.

In certain examples, at block 202, build data may be obtained relating plurality of build layers N'. The build data may include data relating to the order in which the plurality of build layers N' are to be built.

At block 204, the build data may be transmitted to the build unit of the additive manufacturing system 10, for example a build unit as described above. In an example, the build data relating to the build layers N' may be transmitted to the build unit as data relating to one build layer N' at a time. For example, the data relating to one build layer N' may be transmitted to the build unit as soon as it has been processed according to the example method described above.

The build unit may build the build layers N' upon receipt of the build data on a build platform of the build unit.

At block 206 the build material depositing system deposits a layer of build material on the build platform. In certain examples, at block 208, the fusing agent application system may apply fusing agent on to the build material. The fusing agent may define the fusing area(s) of the build layer N'. At block 210, the detailing agent application system may apply detailing agent on to the build material.

At block 212, a fusing system, for example a fusing system as described above, may fuse portions of the build material corresponding to the fusing area(s) of build layer N'. The fused portions form a layer of a 3D object or objects.

At block 214, the build platform 12 may then be moved, for example downwards in the Z-direction. The build process may return to block 202 to build the next build layer N'. The process may be repeated until all the build layers N' defined in the build data have been built.

Figure 10:
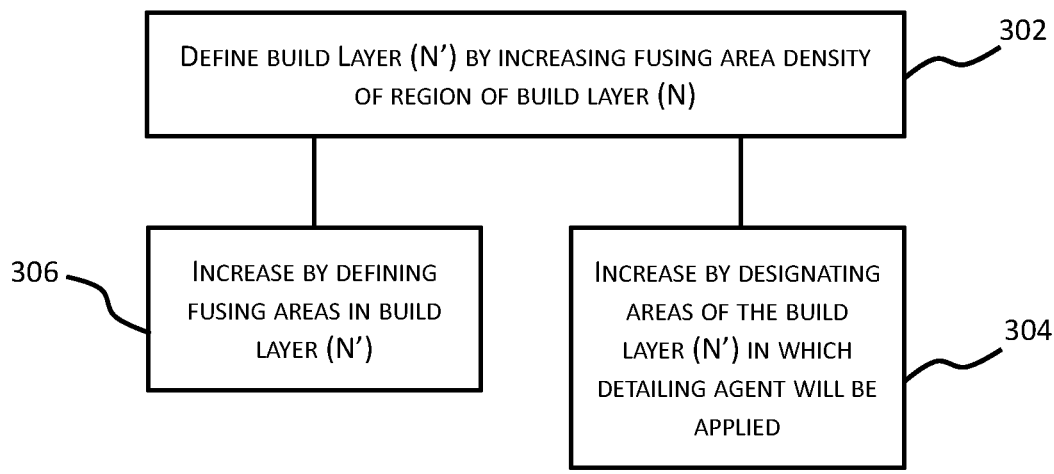
FIG. 10 is a flow chart of an example method of modifying a build layer N to define a build layer N'.
Figure 11:
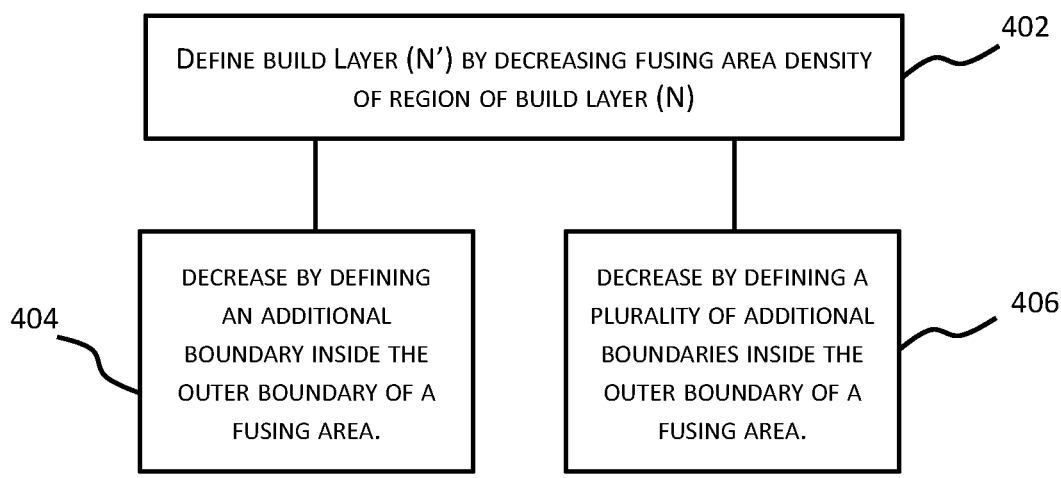
FIG. 11 is a flow chart of an example method of modifying a build layer N to define a build layer N'.

Certain examples of the method of modifying a build layer N will now be described with respect to FIGS. 10 and 11.

Certain examples of the method of modifying a build layer N involve increasing the fusing area density of a region of the build layer N. The examples will be described with respect to the flow chart of FIG. 10.

In an example, at block 302, the build layer N' may be defined by increasing the fusing area density of the region of the build layer N. The increase in fusing area density may made in response to a determination that the region of the build layer N has a fusing area density below the fusing area density tolerance window.

At block 304, in certain examples, increasing the fusing area density of the build layer N may comprise defining areas of the build layer N' in which detailing agent will be applied during building of the build layer N'.

In certain examples, defining areas of the build layer N' in which detailing agent will be applied may comprise defining areas of the build layer N' in which detailing agent structures will be applied. In certain examples, the defining areas of the build layer N' in which detailing agent will be applied may comprise applying solid patches.

At block 306, in certain examples, increasing the fusing area density of the build layer N may comprise may comprise defining fusing areas in the build layer N'.

Certain examples of the method of modifying a build layer N involve decreasing the fusing area density of a region of the build layer N. The examples will be described with respect to the flow chart of FIG. 11.

In an example, at block 402, the build layer N' may be defined by decreasing the fusing area density of the region of the build layer N. The decrease in fusing area density may made in response to a determination that the region of the build layer N has a fusing area density above the fusing area density tolerance window.

At block 404, in certain examples, decreasing the fusing area density of the build layer N may comprise defining at least one additional boundary in a fusing area in which the additional boundary is inside the outer boundary of the fusing area. In an example, the outer boundary of the fusing area may correspond to a contour line of the relevant cross section through a 3D object model.

At block 406, in certain examples, decreasing the fusing area density of the build layer N may comprise defining a plurality of additional boundaries inside the outer boundary of the fusing area. The plurality of additional boundaries may define internal structures in the fusing area. In an example, the outer boundary of the fusing area may correspond to a contour line of the relevant cross section through a 3D object model.

In certain examples, defining the internal structures may be constrained to have the same geometry as all other internal structures defined in a neighbouring fusing area of a neighbouring build layer N'.

In certain examples, the internal structures may be constrained to have the same geometry as all other internal structures defined in a plurality of build layers N'.

Figure 12:
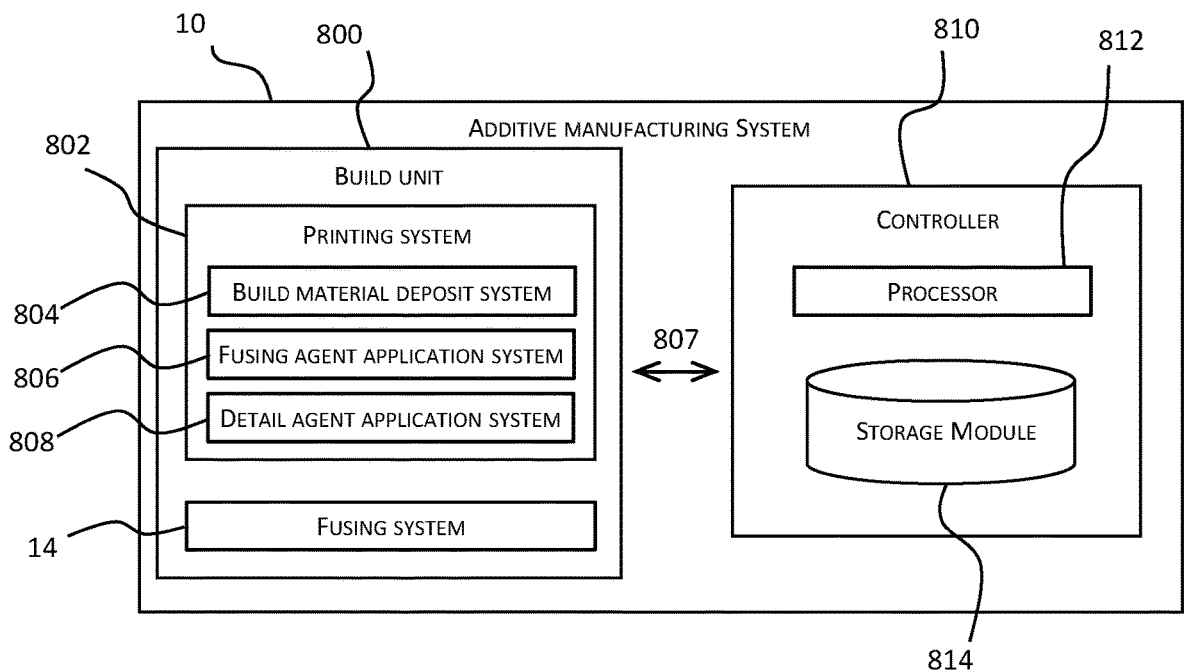
FIG. 12 is a schematic diagram of an example additive manufacturing system.

The method above may be performed in an additive manufacturing system, for example the additive manufacturing system 10 shown schematically in FIG. 12. The additive manufacturing system 10 may comprise a build unit 800. In certain examples, the build unit 800 may be a separate component of the additive manufacturing system 10. The build unit 800 may comprise a build platform 12 as described above (not shown in FIG. 12). The build unit 800 may comprise a printing system 802. In certain examples, the printing system 802 may be a separate component of the additive manufacturing system 10. For example, the printing system 802 may be removable or interchangeable from the additive manufacturing system 10. For example, the printing system 802 may be removable or interchangeable from the build unit 802.

The printing system 802 may comprises a build material depositing system 804. The printing device 802 may comprise a fusing agent application system 806. The printing device 802 may comprise a detailing agent application system 808. The additive manufacturing system 10 may comprise a fusing system 14. The fusing system may be a separate, removable, and/or interchangeable from the additive manufacturing system. In certain examples, as shown in FIG. 12, the build unit 800 may also comprise the fusing system 14. In certain examples, the printing system 802 may be integrated with the fusing system 14.

The additive manufacturing system 10 may comprise a controller 810. The controller 810 may comprise a computing device. The controller 810 may be communicatively connected 807 with the build unit 800 and, therefore, the printing system 806 and the fusing system 14. The controller 810 and the printing system 802 may be communicatively connected with one another via communications interfaces. For example, the controller 810 may be electrically connected to the printing system 810 by way of communication cabling. However, it will be appreciated that a wireless communication protocol could be used instead.

The controller 810 may be fully integrated with the build unit 800 in a single package. Alternatively, the controller 810 may be remote from the build unit 800. For example, the controller 810 may be remotely connected to the build unit over a network, which would allow the controller 810 and the build unit 800 to be located separately from each other, including the possibility of being separated by large distances. Thus, the connection 807 may be a network connection.

The controller 810 may comprise a processor 812. The processor 812 may carry out the methods and/or processes described herein or instruct the methods and/or processes described herein to be carried out in the build unit 800. The controller 810 may comprise a storage module 814. The storage module 814 may comprise a non-transitory storage medium. The non-transitory machine-readable storage medium may be encoded with instructions executable by the processor 812. Some examples of non-transitory storage media are disks, thumb drives, memory cards and do not include propagated signals.

Any of the example methods and/or processes described herein may be encoded in machine readable form on the non-transitory storage medium. For example, the example processes and methods above may be in the form of a computer program comprising computer program code. For example, the non-transitory machine-readable storage medium may be encoded with instructions for performing all, or any of, the blocks described herein. For example, the processor 812 may retrieve and execute the encoded instructions and perform any of the blocks described herein or instruct another device, such as the build unit, to perform any of the blocks described herein. The processor 812 may retrieve and execute encoded instructions and perform additional blocks relating to other functions of the additive manufacturing system.

The processor 812 may be a parallel processor or a serial processor. The processor 812 may execute the instructions may be carried out in any suitable order, or simultaneously.

In certain examples, the non-transitory machine-readable storage medium may be encoded with instructions, which, when executed by a processor, control the processor to: determine, from build data relating to a build layer N of a three-dimensional model to be built by an additive manufacturing system, a fusing area density distribution of the build layer N; and, in response to a determination that a region of the build layer N has a fusing area density outside of a fusing area density tolerance window, modify the build layer N to define a build layer N' in which the region has a fusing area density that is within the fusing area density tolerance window.

The non-transitory machine-readable storage medium may be encoded with the other instructions relating to the functioning of the additive manufacturing system.

It will be appreciated that the example blocks may be implemented at various locations throughout the additive manufacturing system, for instance in the controller 810 or in the build unit 800. As described above, controller 810 or in the build unit 800 may be combined into a single unit and the blocks may be implemented in one location.

It will be appreciated that the example blocks may be implemented at various locations across a network. For example, a remote computer may store encoded instructions for performing an example of the calibration process described above. A local or terminal computer may access the remote computer and access the encoded instructions. It will be appreciated that the example blocks may be implemented by a dedicated circuit, for example a DSP or a programmable logic array.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
   determining, from build data relating to a build layer (N) of a three-dimensional model to be built by an additive manufacturing system, a fusing area density for each of multiple regions of the build layer (N), wherein the fusing area density for each region is defined by a percentage of fusing area coverage in the region; and in response to a determination that a region of the multiple regions of the build layer (N) has a fusing area density outside of a fusing area density tolerance window, modifying the build layer (N) to define a build layer (N') in which the region has a fusing area density that is within the fusing area density tolerance window.

2. A method according to claim 1 comprising:

determining, from the build data relating to the build layer (N), an average of the fusing area densities for the multiple regions of the build layer (N); and setting the fusing area density tolerance window based on the average fusing area density of the build layer (N).

3. A method according to claim 1 wherein:

the build layer (N) has at least one fusing area defined by at least one boundary corresponding to a contour line of a cross-section through a three-dimensional object model; and the build layer (N') has at least one fusing area defined by at least one boundary corresponding to the contour line of the cross-section through the three-dimensional object model.

4. A method according to claim 1 comprising:

in response to a determination that a region of the multiple regions of the build layer (N) has a fusing area density below the fusing area density tolerance window, defining the build layer (N') by increasing the fusing area density of the region of the build layer (N).

5. A method according to claim 4 wherein increasing the fusing area density of the region of the build layer (N) comprises designating areas of the build layer (N') in which detailing agent will be applied during building of the build layer (N').

6. A method according to claim 4 wherein increasing the fusing area density of the region of the build layer (N) comprises defining fusing areas in the build layer (N').

7. A method according to claim 1 comprising:

in response to a determination that a region of the multiple regions of the build layer (N) has a fusing area density above the fusing area density tolerance window, defining the build layer (N') by decreasing the fusing area density of the region of the build layer (N).

8. A method according to claim 7 wherein decreasing the fusing area density of the region of the build layer (N) comprises defining at least one additional boundary of a fusing area wherein the additional boundary is inside the outer boundary of the fusing area.

9. A method according to claim 8 wherein decreasing the fusing area density of the region of the build layer (N) comprises defining a plurality of additional boundaries inside the outer boundary of the fusing area, wherein the plurality of additional boundaries define internal structures in the fusing area.

10. A method according to claim 9 wherein the internal structures are constrained to have the same geometry as all other internal structures defined in a neighbouring fusing area of a neighbouring build layer (N').

11. A method according to claim 9 wherein the internal structures are constrained to have the same geometry as all other internal structures defined in a plurality of build layers (N').

12. A method according to claim 1 comprising building build layer (N') by:

depositing a layer of build material on a build platform of an additive manufacturing system;

applying a fusing agent to the layer of build material wherein the fusing agent defines at least one fusing area of the build layer (N'); and fusing at least one portion of the build material corresponding to the at least one fusing area to form a three-dimensional object layer.

13. A method according to claim 12 wherein the method further comprises applying detailing agent to the layer of build material.

14. A non-transitory machine-readable storage medium, the machine-readable storage medium comprising instructions which, when executed by a processor, control the processor to:

determine, from build data relating to a build layer (N) of a three-dimensional model to be built by an additive manufacturing system, a fusing area density for each of multiple regions of the build layer (N), wherein the fusing area density for each region is defined by a percentage of fusing area coverage in the region; and in response to a determination that a region of the multiple regions of the build layer (N) has a fusing area density outside of a fusing area density tolerance window, modify the build layer (N) to define a build layer (N') in which the region has a fusing area density that is within the fusing area density tolerance window.

15. An additive manufacturing system configured for use with a build unit, the additive manufacturing system comprising:

a fusing system; and a controller including a processor and a non-transitory machine-readable storage medium, wherein the storage medium comprises instructions which, when executed by the processor, control the processor to:

determine, from build data relating to a build layer (N) of a three-dimensional model to be built by an additive manufacturing system, a fusing area density for each of multiple regions of the build layer (N), wherein the fusing area density for each region is defined by a percentage of fusing area coverage in the region; and in response to a determination that a region of the multiple regions of the build layer (N) has a fusing area density outside of a fusing area density tolerance window, modify the build layer (N) to define a build layer (N') in which the region has a fusing area density that is within the fusing area density tolerance window;

and wherein the controller is configured, in use, to:

retrieve the instructions from the storage medium; and cause the instructions to be executed by the processor so that the build unit builds a layer corresponding to build layer (N').

16. A method according to claim 1, wherein the modifying comprises modifying the build layer (N) to define a build layer (N') in which the region has more fusing area for a higher percentage of fusing area coverage compared to the build layer (N).

17. A method according to claim 1, wherein the modifying comprises modifying the build layer (N) to define a build layer (N') in which the region has less fusing area for a lower percentage of fusing area coverage compared to the build layer (N).

18. A storage medium according to claim 14, wherein the instructions to modify comprise instructions to modify the build layer (N) to define a build layer (N') in which the region has more fusing area for a higher percentage of fusing area coverage compared to the build layer (N).

19. A storage medium according to claim 14, wherein the instructions to modify comprise instructions to modify the build layer (N) to define a build layer (N') in which the region has less fusing area for a lower percentage of fusing area coverage compared to the build layer (N).

* * * * *